(12) United States Patent
Takafuji

(10) Patent No.: US 6,618,033 B2
(45) Date of Patent: Sep. 9, 2003

(54) LIQUID CRYSTAL DISPLAY DEVICE

(75) Inventor: Yutaka Takafuji, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/731,815

(22) Filed: Dec. 8, 2000

(65) Prior Publication Data

US 2001/0003446 A1 Jun. 14, 2001

(30) Foreign Application Priority Data

Dec. 8, 1999 (JP) .......................................... 11-348603
Oct. 12, 2000 (JP) ....................................... 2000-311998

(51) Int. Cl.$^7$ ................................................. G09G 3/36
(52) U.S. Cl. ............................. 345/96; 345/92; 345/87; 345/88; 345/89; 345/90
(58) Field of Search .............................. 345/96, 97, 92, 345/87, 88, 89, 84, 90, 55, 50; 349/5, 7, 106, 108, 110, 111

(56) References Cited

U.S. PATENT DOCUMENTS

| | | | | |
|---|---|---|---|---|
| 5,300,449 A | * | 4/1994 | Okumura | 438/161 |
| 5,798,744 A | * | 8/1998 | Tanaka et al. | 345/92 |
| 5,990,989 A | * | 11/1999 | Ozawa | 349/110 |
| 5,995,176 A | * | 11/1999 | Sibahara | 349/111 |
| 6,038,007 A | * | 3/2000 | Watanabe et al. | 349/110 |
| 6,232,621 B1 | * | 5/2001 | Yamazaki et al. | 257/66 |
| 6,373,460 B1 | * | 4/2002 | Kubota et al. | 326/81 |
| 6,388,270 B1 | * | 5/2002 | Yamazaki et al. | 257/57 |
| 6,404,465 B1 | * | 6/2002 | Nakayama et al. | 349/39 |
| 6,421,101 B1 | * | 7/2002 | Zhang et al. | 349/111 |

FOREIGN PATENT DOCUMENTS

| | | | |
|---|---|---|---|
| JP | 9204159 | * | 5/1997 |
| JP | 9-204159 | | 8/1997 |

* cited by examiner

Primary Examiner—Bipin Shalwala
Assistant Examiner—Leonid Shapiro
(74) Attorney, Agent, or Firm—Nixon & Vanderhye P.C.

(57) ABSTRACT

In an active-matrix-driven LCD device, a driver circuit and a display section are formed on one substrate and in which each of thin-film transistors included in the driver circuit and display section has an active layer made of a polysilicon that has been formed by enhancing its crystal growth. The driver circuit operates to write data of a same polarity to all pixels of an entire one-frame screen but write data of different polarities to different frames adjoining each other on a time base at a frame frequency of about 100 Hz or more.

10 Claims, 12 Drawing Sheets

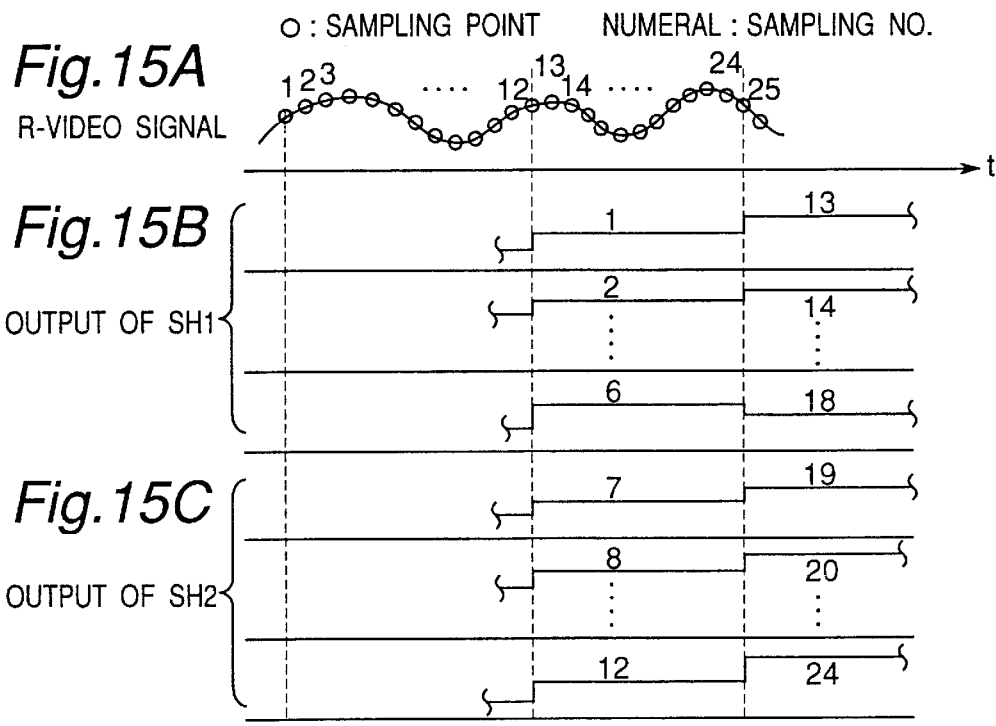
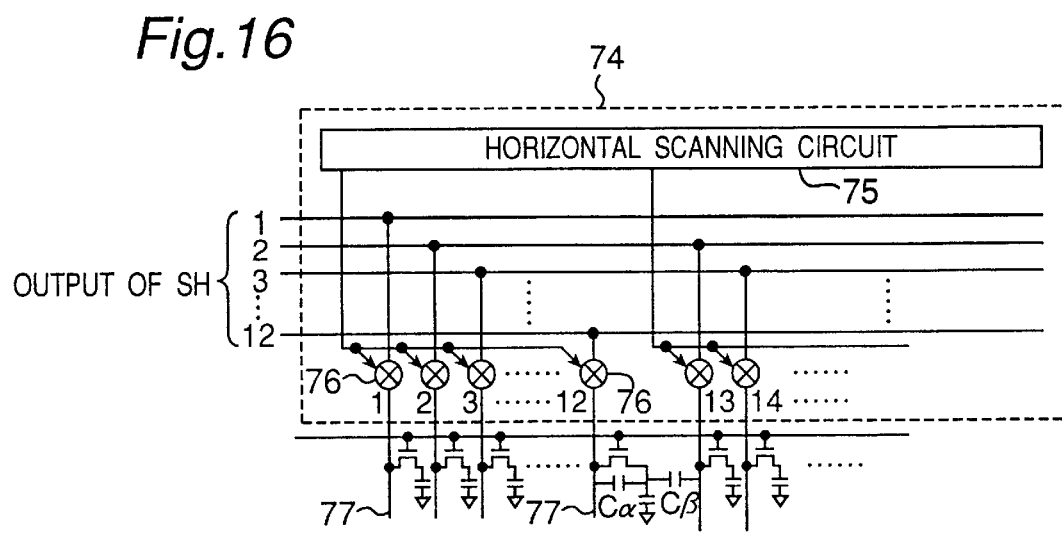

Fig.17A
PRIOR ART
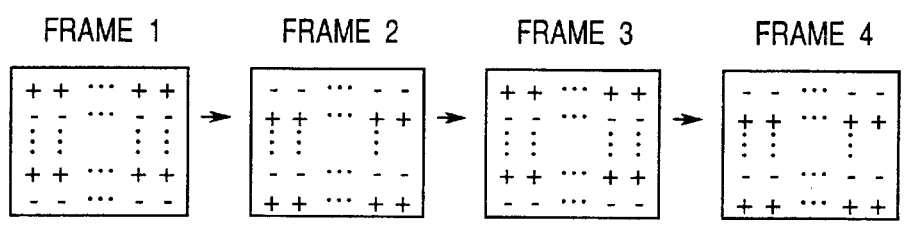
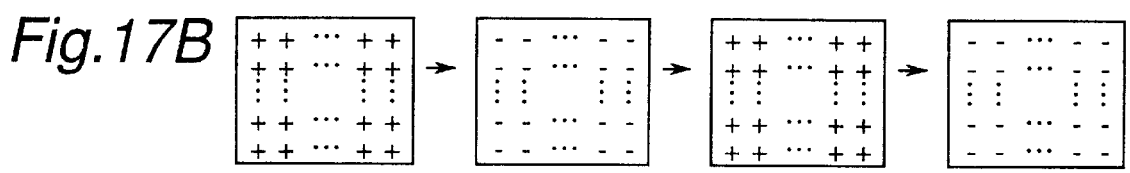

LIQUID CRYSTAL DISPLAY DEVICE

BACKGROUND OF THE INVENTION

The present invention relates to a so-called active-matrix-driven liquid crystal display device which is driven by TFTs (Thin Film Transistors) and, more particularly, to a small-sized liquid crystal display device to be used for projection systems.

FIG. 13 shows an example of the structure of a driving system for a small-sized active-matrix-driven liquid crystal display (LCD) device which has conventionally been used in a projection system. FIG. 17A schematically shows an example of the drive method. Conventionally, because small-sized active-matrix-driven LCD devices used for projection systems require an extremely small pitch of connections of a driver LSI (Large Scale Integrated Circuit), a so-called driver-monolithic LCD device is generally used, which integrally incorporates a driver by using polysilicon TFTs.

As to the driving operation, as shown in FIG. 13, a video data signal to be displayed is fed as an analog signal, and after converted into a digital signal by an A/D converter 1, the signal is subjected to processings by a processor 2 such as gamma control of the display data voltage to adjust the electro-optical response (i.e., V-T curve) of liquid crystals, scaling for format conversion of the screen, etc. The signal thus processed is converted back into an analog signal by a D/A converter 3, and further converted into multiphase parallel signals by a plurality of sample-and-hold circuits 4. After that, with the frequency lowered to "1/(the number of phases)," the signals are supplied to a data driver of an LCD panel through linear amplifiers (not shown).

In the data driver, these and other data signals are sequentially held in capacitances of the source bus line according to the opening/closing of an analog switch (not shown) controlled by an output of a horizontal scanning circuit. Then, these data signals held by the source bus line are transferred to the capacitances of individual pixels connected to the source bus line via the TFTs until one horizontal scanning period terminates. After one horizontal scanning period has terminated, the data signals are held in the capacitances of the pixels.

On the other hand, in the driving operation of liquid crystals, for prevention of an orientation film and liquid crystals from deterioration due to electrochemical reaction as well as prevention of sticking or persistence of image, it is necessary to use an alternating voltage as the voltage applied to the liquid crystals. Therefore, as shown in FIG. 17B, the polarity of the video data signal is alternated every frame so that the AC driving is effectuated. As a result, a signal voltage whose polarity is alternately switched over every frame is applied across a pixel electrode, which has potentials determined by written data, and a counter electrode, whose potential is set to the intermediate potential between the potentials of the pixel electrode.

Liquid crystals respond to root mean square voltages. Thus, if the alternately positive and negative voltage has a completely symmetrical waveform, the resulting optical response occurs at a frequency at which the frame is switched (i.e., frame frequency). However, when the waveform is asymmetrical, even a little, there would arise a sub-harmonic component whose frequency is ½ of the frame frequency. Further, because a TFT has a characteristic that is not completely symmetrical in the positive and negative senses, there would also arise an offset of the DC potential due to feedthrough by switching. Thus, the potential of the counter electrode is set so as to counterbalance any effects of these. However, even if the waveform is adjusted so as to be completely symmetrical in polarity to one data voltage, it is extremely difficult to achieve a completely symmetrical waveform for all data voltages, because of the nonlinearity of capacitances of the liquid crystals and TFTs and/or the asymmetry in polarity and offsets of the gain of a linear amplifier circuit. Moreover, even if the waveform can be made completely symmetrical, the waveform may change with time and shift, resulting in an asymmetrical one.

Generally, the frame frequency is 60 Hz–85 Hz, and its secondary sub-harmonic frequency component, which has a frequency of 30 Hz–43 Hz, is observed as a flicker to human eyes, causing the display quality to be considerably impaired. To avoid this, it has conventionally been practiced to exert the so-called line inversion drive that the frequency at which liquid crystals blink is artificially doubled as shown in FIG. 17A so as to make the flicker indiscernible.

However, the small-sized active-matrix-driven LCD device used in conventional projection systems has the following problems. That is, in the drive method for the LCD device (scan line inversion drive in the example shown in FIG. 17A), voltages of opposite polarities are applied to adjoining pixel electrodes in order to avoid the flicker. Due to this, at electrode edge of a pixel electrode sandwiched by opposite-polarity voltages, a uniform electric field between the pixel electrode and the counter electrode (hereinafter, referred to as a "longitudinal electric field") is disturbed, causing a component of an electric field in a transverse direction (hereinafter, referred to as a "transverse electric field") to arise. Therefore, for example, in the TN (Twisted Nematic) mode, there arises an inverted tilt region in response to a transverse electric field and depending on a pre-tilt. As a result, in the normally white mode in which the polarizer is set cross-Nicol, at and around a pixel electrode edge between the pixels with different polarity data, where the pre-tilt region and the inverted tilt region appear depending on the surface unevenness, pre-tilt angle, and the transverse electric field, there arise a region where light leakage occurs in the black display state as well as a region where the electro-optical response (V-T curve) of liquid crystals to display data voltages is shifted toward the higher voltage side. This would lower the contrast considerably. On the other hand, in the normally black mode in which the polarizer is set parallel-Nicol, the transmittance for the white level would lower by the above effects caused by the transverse electric field and, in addition to this, a high contrast as well as a neutral black are hard to realize because the same rotation of polarization axis or optical rotatory dispersion is not achieved over the entire visible range. Consequently, the practical display in the TN mode is limited to the normally white mode in which the polarizer is set cross-Nicol.

In order to obtain a sufficient display quality in the normally white mode, the region where the light-leakage occurs as well as the region where the V-T curve is shifted toward the higher voltage side need to be shielded from light. The region where the light-leakage occurs and the region where the V-T curve is shifted toward the higher voltage side extend over a generally constant distance from either pixel end, and thus, have noticeable effects particularly for small-sized pixels. In the conventional small-sized active-matrix-driven LCD device or the like used in the projection systems, the source line inversion drive was early adopted because the problems involved in drive would less occur. However, as the pixel size was scaled down more and more, the region to be shielded from light went relatively larger, which has led to a considerably lowered aperture ratio.

In the display section, as shown in FIG. 12, while only source bus lines 5 are provided vertically, gate bus lines 6 and common lines 7 for storage capacitors are provided laterally. Therefore, originally, the laterally-extending region that does not transmit light is larger than the vertically-extending region that does not transmit light. Thus, the scan line inversion drive, although having some problem in terms of drive, has come to be adopted for the purpose of utilizing, as a light-shield region, the laterally extending region that originally does not transmit light, and the light-shield region 8 is provided between pixels 9, 9 adjoining each other along the direction in which the source bus line 5 extends, so that decrease of the aperture ratio can be prevented.

However, in the conventional small-sized active-matrix-driven LCD device or the like used for the projection systems, if the pixel size becomes smaller, further light shield is needed for regions near upper and lower ends of the pixel electrodes where the contrast considerably lowers, which makes it extremely difficult to further raise the aperture ratio. A solution to such problems involved in the inversion drive is provided by a drive method eliminating spatial inversion display in the line inversion drive or the like (hereinafter, this drive method will be referred to as "frame inversion drive") as shown in FIG. 17B.

However, in this frame inversion drive, optical response is made at a frequency at which the frame is switched over (i.e., frame frequency). In this connection, unfortunately, if the waveform is even slightly asymmetrical, there would arise sub-harmonic frequency components whose frequency is ½ of the frame frequency. As described before, the TFT characteristics are not completely symmetrical in polarity, which makes it extremely difficult to make a completely symmetrical waveform for all the data voltages, and moreover the waveform may be shifted due to changes with time, which causes the waveform to be asymmetrical.

Generally, the frame frequency is 60 Hz–85 Hz, its secondary sub-harmonic frequency component being 30 Hz–43 Hz. This secondary sub-harmonic frequency component is observed as a flicker, causing the display quality to be considerably impaired. To avoid this, a method for preventing the flicker by increasing the frame frequency about twice is disclosed in Japanese Patent Laid-Open Publication HEI 9-204159.

However, in the small-sized active-matrix-driven LCD device used in conventional projection systems, the driver monolithic structure using polysilicon TFTs has been adopted in order to avoid extremely reducing the pitch of connections of driver LSIs as described before. Polysilicon TFTs are considerably inferior in characteristics to single crystal silicon transistors, thus having limitations in high-speed operation. Therefore, in a conventional small-sized active-matrix-driven LCD device used in projection systems, the signal is converted into multiphase parallel signals by analog sample-and-hold circuits 4 as shown in FIG. 13, with the operating frequency lowered, and the signals are supplied to the data driver on the LCD panel. For example, when XGA (eXtended video Graphics Array) display is performed, the video signal is divided into as many as 12 phases per LCD device and the operating speed of the source data signal of XGA is dropped to ¹⁄₁₂ by the data driver on the LCD panel side.

Accordingly, in order to prevent the flicker by raising the frame frequency twice in this state, it is necessary to divide the video signal into 24 (=12×2) phases so as to obtain an usual video transfer rate. As a consequence, disadvantageously, not only the scale of external circuit is increased, with a cost increase incurred, but also the number of connections of input terminals to the LCD panel is increased and the scan driver is complicated, resulting in a decrease of yield. Further, in the case where the frame inversion drive is performed, since a parasitic capacitance exists between the source bus line and display pixels, reduction of the area of the storage capacitors to increase the aperture ratio would cause the parasitic capacitance to increase in ratio, which inevitably involves occurrences of crosstalk. This will invite a considerable deterioration of image quality.

In another respect, there are limitations in the voltage of display data (video signal) supplied from the data driver, from the viewpoints of transistors' breakdown or withstand voltage and power consumption of the data driver. Therefore, when the horizontal line inversion drive is performed, a voltage loss is caused because of capacitances between pixels adjacent in the vertical direction and a higher drive voltage is required. That is, the drive voltage applied to the liquid crystals is insufficient. This causes a problem that a high contrast is hard to realize particularly in the normally white mode display.

Further, the horizontal line inversion drive has the following problems in the case where the data driver is so structured that the video signal is sequentially held in capacitors of the source bus line by analog switches controlled by output of the horizontal scanning circuit and where executed is the drive method that the video signal is divided into multiphase signals and then supplied in parallel with a lower frequency. That is, normally, the divided multiphase video signals are simultaneously sampled by analog switches. However, when capacitive coupling is present between right and left pixels, the hold potentials of adjoining pixels in a simultaneously-sampled pixel block and a next-sampled pixel block will vary, and the variations are observed as vertical stripes disadvantageously.

SUMMARY OF THE INVENTION

Therefore, an object of the present invention is to provide an LCD device capable of realizing a high contrast and a high aperture ratio at the same time and capable of high quality display.

In order to accomplish the above object, there is provided, according to a first aspect of the present invention, an active-matrix-driven LCD device in which a driver circuit and a display section are formed on one substrate and in which each of thin-film transistors included in the driver circuit and display section has an active layer made of a polysilicon that has been formed by enhancing crystal growth thereof, wherein the driver circuit operates to write data of a same polarity to all pixels of an entire one-frame screen but write data of different polarities to different frames adjoining each other on a time base at a frame frequency of about 100 Hz or more.

With this arrangement, each TFT used here has, as the active layer, a polysilicon formed by enhancing its crystal growth. Therefore, the TFTs have an electron mobility about twice higher than TFTs using normal polysilicon for the active layer, so that a frame inversion drive at a double rate of the normal frame frequency of about 60 Hz can be performed. As a result, there will occur no transverse electric fields between pixels adjoining each other along the source bus line, and this prevents the decrease of contrast due to occurrence of light leakage in the black display state in the normally white mode. Furthermore, even if the waveform of a data signal becomes asymmetrical due to asymmetry of data voltage, asymmetry of TFT characteristics, changes with time of data voltage or other reasons, and eventually a secondary sub-harmonic frequency component takes place, such a sub-harmonic frequency component will not be observed as the flicker thanks to the frame inversion drive at the double speed. Actually, the frame inversion drive at a frame frequency of about 100 Hz or higher will be able to produce effects similar to those produced by the frame inversion drive at the above double speed.

In this case, since the double-speed frame inversion drive is implemented by speeding up the operation of the driver circuit, an active-matrix-driven LCD device free from the flicker can be realized without any scale-up of external circuits, increase in connection counts of input terminals, complication of peripheral driver circuits, or increase in cost.

In other words, according to the invention, it is possible to dispense with a light-shield pattern to prevent the light leakage and thus to obtain a high aperture ratio. Thus, an LCD device which is high in aperture ratio and free from occurrence of contrast decrease and flicker, thus superior in display quality, can be provided.

In the LCD device, the driver circuit may comprise a data driver, and the LCD device may further comprise an electrically shielding means provided between a source bus line and pixel electrodes, the source bus line supplying data coming from the data driver to each of the pixel electrodes of the display section.

With this constitution, by the function of the electrical shielding means provided between the source bus line and the pixel electrodes, the effects of the capacitance between the source bus line and the pixel electrodes are reduced, so that vertical crosstalk can be prevented. Thus, the image quality is prevented from noticeable deterioration.

In the LCD device, the driver circuit may comprise a data driver which performs a dot sequential drive by which a plurality of parallelized data are simultaneously sampled.

With this arrangement, performing the frame inversion drive by the driver circuit can suppress a potential variation of a pixel electrode in a current simultaneously-sampled block which pixel electrode is in contact with a next sampled pixel block. Thus, the stripes on the screen are prevented.

In the LCD device, an array pitch of the pixels in the display section may be about 25 μm×25 μm or less.

With this constitution, in a high-definition LCD device in which the array pitch of pixels is about 25 μm×25 μm or less, the aperture ratio of pixels is enhanced, so that a high-quality image with high contrast and no flicker is displayed. Accordingly, the present invention realizes a high-quality small-sized active-matrix-driven LCD device of the driver monolithic type usable for projection systems.

In one embodiment, the parallelization of the data is performed so that twelve parallelized data are obtained. That is, the parallelization is performed in such a way that a dot clock of an original data signal made to be displayed by the data driver may be set 12 MHz or more per data.

With this arrangement, the dot clock of the normal speed data signal becomes about twice a normal one (6.25 MHz) and, in the XGA display, a double-speed drive of 12-phase development is performed.

There is provided, according to a second aspect of the invention, An active-matrix-driven LCD device having a driver circuit and a display section, wherein the driver circuit operates to write data of a same polarity to all pixels of an entire one-frame screen but write data of different polarities to different frames adjoining each other on a time base, and a capacitance is provided between pixel electrodes adjoining each other along a source bus line in the display section, said capacitance including an inter-electrode capacitance between the adjoining pixel electrodes and/or a capacitance given by an overlap of an electrically conductive light-shield layer with the adjoining pixel electrodes, said conductive light-shield layer being connected to a drain of a thin film transistor and disposed under the adjoining pixel electrodes with an insulating film interposed therebetween.

In this constitution, when the frame inversion drive is performed, a voltage resulting from adding a voltage corresponding to the capacitance between pixel electrodes adjoining each other along the extending direction of the source bus line to the voltage of data supplied from the driver circuit is applied to the pixel electrodes in the display section. Thus, the same contrast as in conventional LCD devices can be obtained with data of a lower voltage than in the conventional LCD devices, or else a sufficient drive voltage is applied to liquid crystals so that a high contrast can be obtained without sacrificing the aperture ratio of each pixel.

Consequently, according to this invention, in the normally white mode display, in which the drive voltage applied to liquid crystals becomes insufficient because of restrictions imposed on the level of data signals from the viewpoints of breakdown voltage of TFTs and power consumption, the insufficient drive voltage is compensated and a high contrast is obtained.

If a space between the pixel electrodes adjoining each other in a direction in which the source bus line extends is about 15% or less of a length along the source bus line of the pixel electrodes, a coupling capacitance that allows a sufficient voltage to be added to the voltage applied to the pixel electrodes is obtainable. Thus, a high contrast can be obtained without sacrificing the aperture ratio of each pixel, by the simple method of just adjusting the space between the pixel electrodes.

In one embodiment, the capacitance between pixel electrodes adjoining each other in a direction in which the source bus line extends is within a range of not less than 0.5% but not more than 10% of a storage capacitance associated with the pixel electrodes including a parasitic capacitance.

With this constitution, since the capacitance between pixel electrodes adjoining each other in the direction along which the source bus line extends is not less than 0.5% of the storage capacitance, the capacitance can sufficiently provide a voltage to be added to the voltage applied to the pixel electrodes. Further, since the capacitance between pixel electrodes is not more than 10% of the storage capacitance, variations in the capacitance between the pixel electrodes hardly affect the added voltage. Thus, a stable, sufficient voltage is added to the voltage applied to the pixel electrodes so that a high contrast can be obtained without sacrificing the aperture ratio of each pixel.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3A is a view showing video signal waveforms used for the drive of the driver-integrated panel shown in FIG. 2, while

FIGS. 15A, 15B and 15C are explanatory views of a sampling operation by the R-color sample-and-hold circuits of FIG. 14;

FIG. 16 is a view showing an example of the circuitry of a data driver; and

FIGS. 17A and 17B are conceptual views showing spatial distribution of pixel potentials relative to time changes in the line inversion drive and the frame inversion drive.

DETAILED DESCRIPTION OF THE PREFERRED EMBODIMENTS

Hereinbelow, the present invention is described in detail by way of embodiments thereof illustrated in the accompanying drawings.

(First Embodiment)

As described above, polysilicon TFTs are considerably inferior in characteristics to single crystal silicon transistors, thus having limitations in high-speed operation. Therefore, in this embodiment, TFTs are formed, which each have an active layer of a polysilicon formed by adding at least one of Ni, Pt, Sn, and Pd to an amorphous silicon (a—Si) film to enhance its crystal growth. Then, by making up a driver-integrated panel with these TFTs, an operating speed twice or more faster than that of driver-integrated panels using conventional polysilicon TFTs is realized so that the frame frequency is raised about twice to prevent the flicker.

Figure 1:
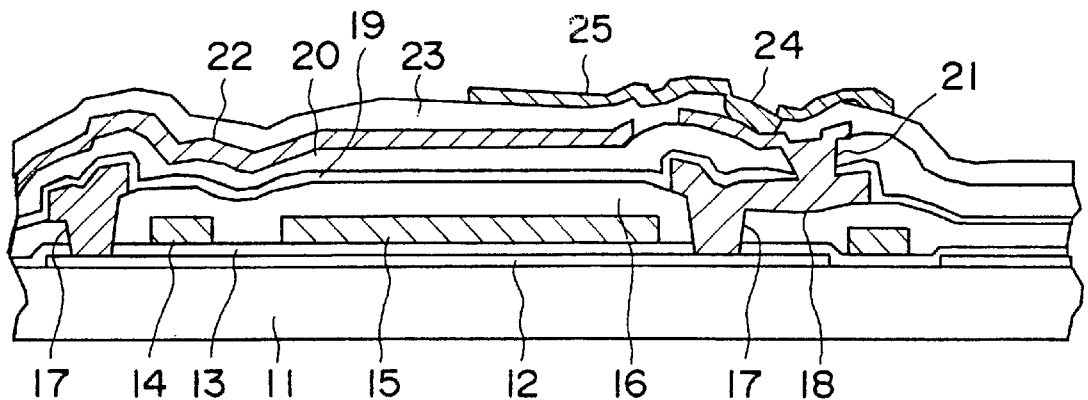
FIG. 1 is a sectional view of a main part of a TFT used for pixels in an LCD device of the present invention.

FIG. 1 is a sectional view of a main-part of a TFT used in the display pixel part of this embodiment. This TFT is made by the following procedure.

First, an a—Si film 12 is deposited on the entire surface of an insulating substrate 11. Then, in order to make the Si surface hydrophilic and control the surface property, a thin oxide film is formed on the surface and further spin-coated thereon with a nickel acetate aqueous solution. Next, solid-phase epitaxy is performed at 600° C. for about 12 hours, by which the a—Si film 12 is crystallized into polycrystalline Si. A $SiO_2$ film is deposited on the polycrystalline Si layer, and the oxide and $SiO_2$ films are removed, except for portions where active regions of devices are to be formed.

Next, with the remaining $SiO_2$ film used as a mask, high-concentration $p^+$ ions are implanted (at 15 keV, $5\times10^{15}$ $cm^{-2}$), and then a 12-hour heat treatment is performed at 600° C. Subsequently, with the $SiO_2$ film used as a mask, the $p^+$ ion implanted regions of the polycrystalline Si film and then $SiO_2$ film are removed and, afterwards, a $SiO_2$ film 12 is again deposited on the entire polycrystalline Si film 12. Further, an about one-hour oxidation process is performed in a 950° C. oxidizing atmosphere containing hydrochloric acid, by which residual metal atoms are removed from the polycrystalline Si film 12. Next, the $SiO_2$ film on the polycrystalline Si film 12 and then part of polycrystalline Si is removed, so that portions of the polycrystalline Si film 12 to make active regions of devices are left while unnecessary portions of the polycrystalline Si film 12 are removed. Then, by processes similar to normal, well-known polysilicon TFT fabrication processes, a gate oxide 13, a gate electrode 14 and a common line 15 for the storage capacitors are formed, and thereafter $p^+$ ions and $B^+$ ions are implanted into the polycrystalline Si film 12. Further, $SiO_2$ film and BPSG (boro-phospho silicate glass) planarization film 16, a contact hole 17, a metal (AlSi) line 18, an interlayer insulator composed of SiNx film 19 and $SiO_2$ film 20, a via hole 21, a light-shield or light-tight film 22, an interlayer insulator 23, a pixel contact hole 24, and a transparent pixel electrode 25 are formed one after another. In this way, TFTs to be used for the drivers and the display section in the LCD device of this embodiment are completed.

Figure 2:
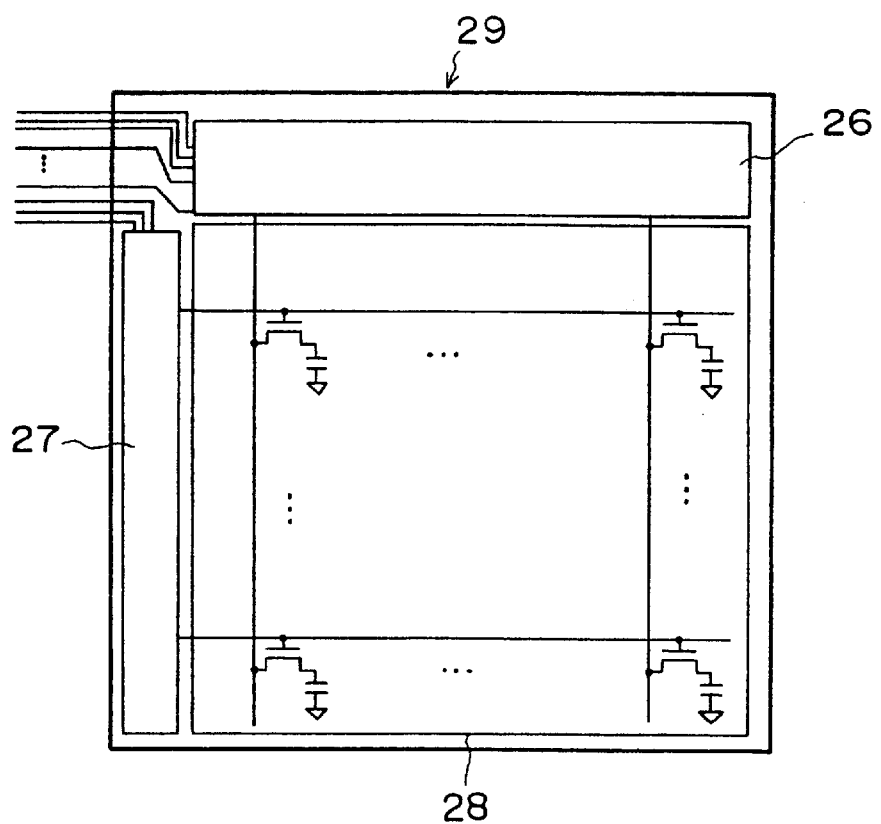
FIG. 2 is a block diagram of a driver-integrated panel formed by using the TFTs shown in FIG. 1.
Figure 3A:
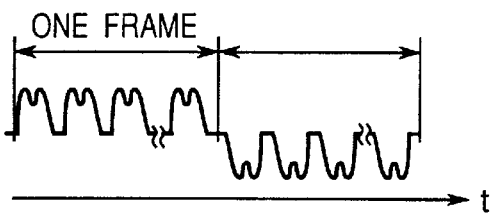

The TFTs obtained in this way have an about 2–2.5 times higher mobility, compared with conventional high-temperature polysilicon TFTs having a mobility of about 100 $cm^2$/V·sec. Besides, as shown in FIG. 2, a driver-integrated panel 29 was made by using the thus fabricated TFTs for drivers 26, 27 and an LCD section 28. In this case, in a non-interlace scan at a frame rate of 120 Hz as shown in FIG. 3A, when the video signal was transformed into 12-phase parallel signals and the driver-integrated panel 29 was operated at ⅙ the frequency of the original video signal to implement XGA display, the driver-integrated panel 29 exhibited a stable operation while a bright, uniform display free from any flicker was obtained.

Figure 3B:
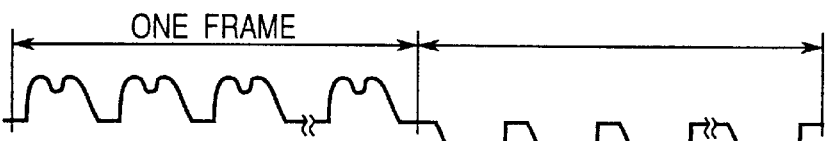
FIGS. 3B and 3C are views of video signal waveforms used for the drive of a conventional driver-integrated panel.
Figure 3C:
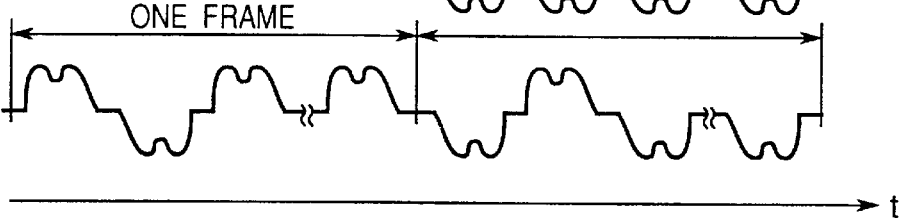

In the case of a driver-integrated panel made by using conventional high-temperature polysilicon TFTs, in a non-interlace scan at a frame rate of 60 Hz as shown in FIG. 3B, when the video signal was converted into 12-phase parallel signals and the driver-integrated panel was operated at 1/12 the frequency of the original video signal, a stable operation was obtained. However, in a non-interlace scan at a frame rate of 120 Hz as shown in FIG. 3A, the driver-integrated panel did not operate or even if the driver-integrated panel operated, the driver circuit was unstable in operation, causing a wrong timing of sampling so that a correct display was not obtained.

As shown above, in this embodiment, crystal growth is enhanced by adding Ni to the a—Si film 12, thus achieving crystallization of a—Si to polycrystalline Si, by which the active layer is formed. As a result, a TFT having electron mobility about 2–2.5 times higher the mobility of conventional high-temperature polysilicon TFTs can be obtained. Therefore, by making the driver-integrated panel 29 using such TFTs, an operating frequency twice or more as high as that of conventional driver-integrated panels using high-temperature polysilicon TFTs can be realized.

Consequently, with the driver-integrated panel 29 of this embodiment, in the frame inversion drive mode, the frame frequency is increased about twice so as to prevent the flicker, thus enabling a high-quality display to be obtained. In this case, the doubling of the frame frequency is implemented by increasing the speed of the data driver 26. Thus, the doubling of the frame frequency does neither cause any scale-up of external circuits nor complicate the horizontal driver circuit, so that neither decrease of yield nor increase of cost is incurred.

In this embodiment, Ni is added to the a—Si film 12 for enhancement of crystal growth for the polysilicon film. However, the invention not being limited to this, adding at least one of Ni, Pt, Sn and Pd allows the crystal growth for the polysilicon film to be enhanced. Also in this embodiment, after the a—Si film 12 is crystallized into polycrystalline Si, high-concentration p+ ions are implanted and heat treatment is performed to remove added Ni atoms. Alternatively, the concentration of the Ni atoms may be reduced by, for example, oxidation by hydrochloric acid.

(Second Embodiment)

In this embodiment, TFTs are each formed with an active layer made of a polysilicon which is formed by enhancing its crystal growth by an oxidation process of 950° C. or more. Then, by making a driver-integrated panel with the use of such TFTs, an operating speed twice or more as fast as that of conventional driver-integrated panels using polysilicon TFTs is realized, so that the frame frequency is raised about twice, thereby preventing the flicker.

A main part of each TFT to be used in the display pixel part of the LCD device of this embodiment has a cross section as in FIG. 1. The TFT is fabricated by the following procedure. It is noted that the same reference numerals as in FIG. 1 are used in the following description.

First, an a-Si film 12 is deposited on the entire surface of an insulating substrate 11 and then a heat treatment is performed at 600° C. for about 12 hours so that a polycrystalline Si film is formed by solid phase epitaxy. Thereafter, by performing an oxidation process for about 30 Winutes in an oxidizing atmosphere of 950° C. or more, the crystal growth of the polycrystalline Si film is enhanced. Next, while portions of the polycrystalline Si film 12 that are to be active regions of devices are left, unnecessary portions of the film 12 are removed. After this, by processes similar to normal, well-known polysilicon TFT fabrication processes, gate oxide 13, a gate electrode 14 and a common line 15 for storage capacitors of pixels are formed, and thereafter p+ ions and B+ ions are implanted into the remaining polycrystalline Si film 12. Further, $SiO_2$ film and BPSG (borophospho silicate glass) planarization film 16, a contact hole 17, a metal (AlSi) line 18, an interlayer insulator composed of SiNx (silicon nitride) film 19 and $SiO_2$ film 20, a via hole 21, a light-shield film 22, an interlayer insulator 23, a pixel contact hole 24, and a transparent pixel electrode 25 are formed one after another. In this way, TFTs to be used for the drivers and the display section in the LCD device of this embodiment are completed.

The TFTs obtained in this way have an about 2–2.5 times higher mobility, compared with conventional high-temperature polysilicon TFTs having a mobility of about 100 $cm^2$/V·sec. Besides, as shown in FIG. 2, a driver-integrated panel 29 was made by using the thus fabricated TFTs for drivers 26, 27 and an LCD section 28. In this case, in a non-interlace scan at a frame rate of 120 Hz as shown in FIG. 3A, when the video signal was transformed into 12-phase parallel signals and the driver-integrated panel 29 was operated at ⅙ the frequency of the original video signal to implement XGA display, the driver-integrated panel 29 exhibited a stable operation while a bright, uniform display free from any flicker was obtained.

In the case of a driver-integrated panel made by using conventional high-temperature polysilicon TFTs, in a non-interlace scan at a frame rate of 60 Hz as shown in FIG. 3B, when the video signal was converted into 12-phase parallel signals and the driver-integrated panel was operated at 1/12 the frequency of the original video signal, a stable operation was obtained. However, in a non-interlace scan at a frame rate of 120 Hz as shown in FIG. 3A, the driver-integrated panel did not operate or even if the driver-integrated panel operated, the driver circuit was unstable in operation, causing a wrong timing of sampling so that a correct display was not obtained.

As shown above, in this embodiment, crystal growth is enhanced by adding Ni to the a—Si film 12, thus achieving crystallization of a—Si to polycrystalline Si, by which the active layer is formed. As a result, a TFT having a mobility about 2–2.5 times higher the mobility of conventional high-temperature polysilicon TFTs can be obtained. Therefore, by making the driver-integrated panel 29 using such TFTs, an operating frequency twice or more as high as that of conventional driver-integrated panels using high-temperature polysilicon TFTs can be realized.

Consequently, with the driver-integrated panel 29 of this embodiment, in the frame inversion drive mode, the frame frequency is raised about twice so as to prevent the flicker, thus enabling a high-quality display to be obtained. In this case, the doubling of the frame frequency is implemented by increasing the speed of the data driver 26. Thus, the doubling of the frame frequency does neither cause any scale-up of external circuits nor complicate the horizontal driver circuit, so that neither decrease of yield nor increase of cost is incurred.

As shown above, in this embodiment, the polycrystalline Si film is subjected to an about 30 min. oxidation process in an oxidizing atmosphere of 950° C. or more, whereby the active layer is formed. As a result, a TFT having a mobility about 2–2.5 times higher the mobility of conventional high-temperature polysilicon TFTs can be obtained. Therefore, by making the driver-integrated panel 29 using such TFTs, an operating frequency twice or more as high as that of conventional driver-integrated panels using high-temperature polysilicon TFTs can be realized.

Consequently, with the driver-integrated panel 29 of this embodiment, in the frame inversion drive mode, the frame frequency is raised about twice so as to prevent the flicker, thus enabling a high-quality display to be obtained. In this case, the doubling of the frame frequency is implemented by increasing the speed of the data driver 26. Thus, the doubling of the frame frequency does neither cause any scale-up of external circuits nor complicate the horizontal driver circuit, so that neither decrease of yield nor increase of cost is incurred.

In this embodiment, the polycrystalline Si film is subjected to an oxidation process of 950° C. or more to enhance the crystal growth of the polycrystalline Si film. However, the invention not being limited to this, the temperature in the oxidation process may be about 900° C. or higher.

(Third Embodiment)

In this embodiment, TFTs are each formed with an active layer made of a polysilicon which is formed by enhancing its crystal growth by a high-pressure oxidation process in a 5 atm. or higher pressured atmosphere containing dry $O_2$ or water vapor. Then, by making a driver-integrated panel with the use of such TFTs, an operating speed twice or more as fast as that of conventional driver-integrated panels using polysilicon TFTs is realized, so that the frame frequency is raised about twice, thereby preventing the flicker.

A main part of each TFT to be used in the display pixel part of the LCD device of this embodiment has a cross section as in FIG. 1. The TFT is fabricated by the following procedure. It is noted that the same reference numerals as in FIG. 1 are used in the following description.

First, an a—Si film 12 is deposited on the entire surface of an insulating substrate 11 and then a heat treatment is performed at 600° C. for about 12 hours so that a polycrystalline Si film is formed by solid phase epitaxy. Thereafter, a high-pressure oxidation process is performed at 600° C. for about 30 minutes in a $1\times10^5$ Pa or higher pressured atmosphere containing dry $O_2$ or water vapor, and the crystal growth of the polycrystalline Si film is enhanced. Next, while portions of the polycrystalline Si film 12 that are to be active regions of devices are left, unnecessary portions of the film 12 are removed. After this, by processes similar to normal, well-known polysilicon TFT fabrication processes, gate oxide 13, a gate electrode 14 and a common line 15 for auxiliary electrode capacitances of pixels are formed, and thereafter $p^+$ ions and $B^+$ ions are implanted into the remaining polycrystalline Si film 12. Further, $SiO_2$ film and BPSG planarization film 16, a contact hole 17, a metal (AlSi) line 18, an interlayer insulator composed of SiNx film 19 and $SiO_2$ film 20, a via hole 21, a light-shield film 22, an interlayer insulator 23, a pixel contact hole 24, and a transparent pixel electrode 25 are formed one after another. In this way, TFTs to be used for the drivers and the display section in the LCD device of this embodiment are completed.

The TFTs obtained in this way have an about 2–2.5 times higher mobility, compared with conventional high-temperature polysilicon TFTs having a mobility of about 100 $cm^2/V\cdot sec$. Besides, as shown in FIG. 2, a driver-integrated panel 29 was made by using the thus fabricated TFTs for drivers 26, 27 and an LCD section 28. In this case, in a non-interlace scan at a frame rate of 120 Hz as shown in FIG. 3A, when the video signal was transformed into 12-phase parallel signals and the driver-integrated panel 29 was operated at ⅙ the frequency of the original video signal to implement XGA display, the driver-integrated panel 29 exhibited a stable operation while a bright, uniform display free from any flicker was obtained.

In the case of a driver-integrated panel made by using conventional high-temperature polysilicon TFTs, in a non-interlace scan at a frame rate of 60 Hz as shown in FIG. 3B, when the video signal was converted into 12-phase parallel signals and the driver-integrated panel was operated at 1/12 the frequency of the original video signal, a stable operation was obtained. However, in a non-interlace scan at a frame rate of 120 Hz as shown in FIG. 3A, the driver-integrated panel did not operate or even if the driver-integrated panel operated, the driver circuit was unstable in operation, causing a wrong timing of sampling so that a correct display was not obtained.

As shown above, in this embodiment, the polycrystalline Si film is subjected to an oxidation process in a $1\times10^5$ Pa or higher pressured atmosphere containing dry $O_2$ or water vapor so that the active layer is formed. As a result, a TFT having a mobility about 2–2.5 times higher the mobility of conventional high-temperature polysilicon TFTs can be obtained. Therefore, by making the driver-integrated panel 29 using such TFTs, an operating frequency twice or more as high as that of conventional driver-integrated panels using high-temperature polysilicon TFTs can be realized.

Thus, with the driver-integrated panel 29 of this embodiment, in the frame inversion drive mode, the frame frequency is raised about twice so as to prevent the flicker, thus enabling a high-quality display to be obtained. In this case, the doubling of the frame frequency is implemented by increasing the speed of the data driver 26. Thus, the doubling of the frame frequency does neither cause any scale-up of external circuits nor complicate the horizontal driver circuit, so that neither decrease of yield nor increase of cost is incurred.

In this embodiment, the polycrystalline Si film is subjected to an oxidation process in a $1\times10^5$ Pa or higher pressured atmosphere containing dry $O_2$ or water vapor to enhance the crystal growth of the polycrystalline Si film. However, the invention not being limited to this, the oxidation process may be done in an atmosphere of 5 atm. or higher containing dry $O_2$ or water vapor.

(Fourth Embodiment)

Figure 4:
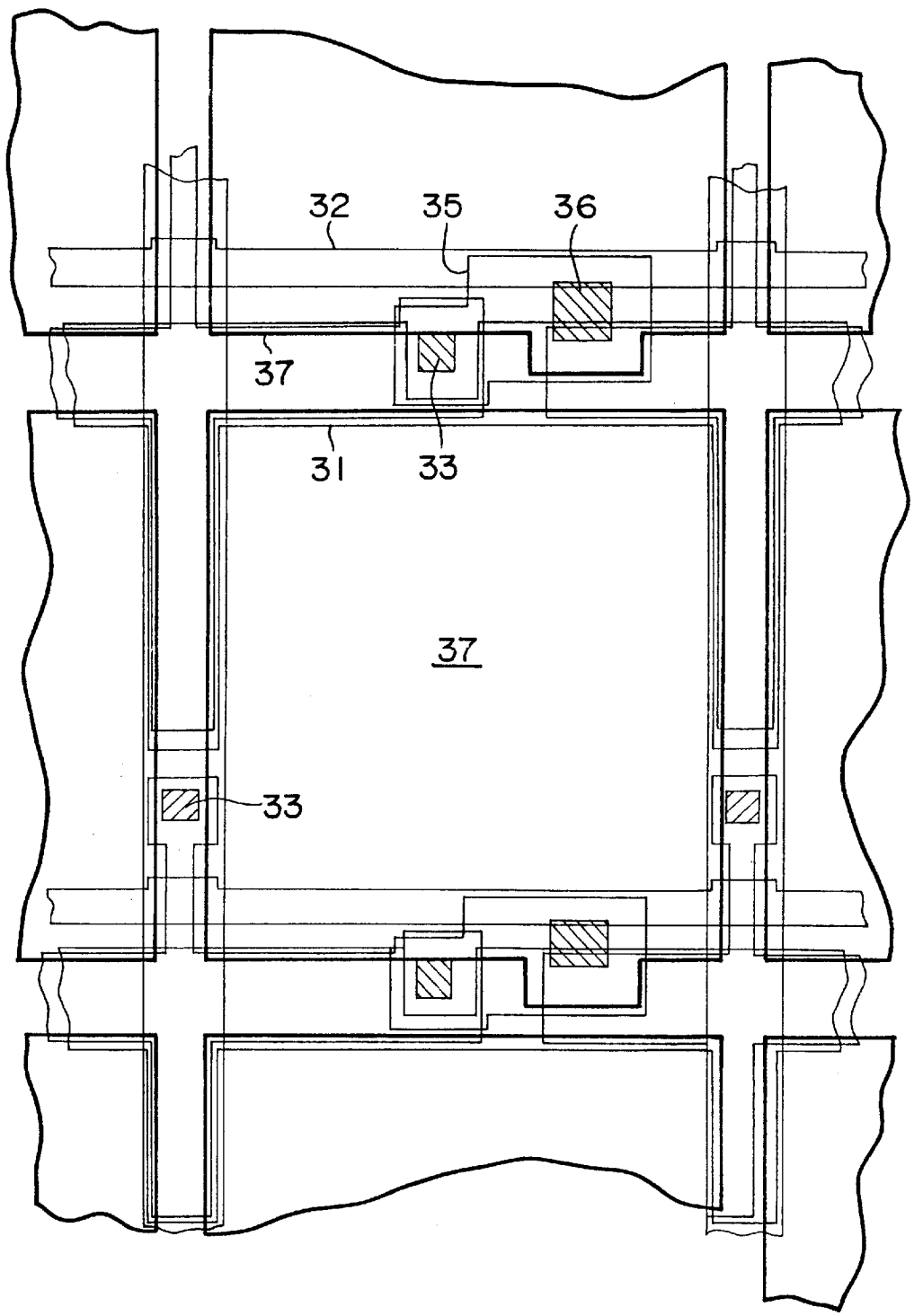
FIG. 4 is a view showing the layout of a display pixel part in the LCD device of the invention.

FIG. 4 schematically shows the layout of a display pixel part in an LCD device of this embodiment. In this embodiment, TFTs to be used for the pixels are given by a TFT that realizes the double speed of conventional polysilicon TFTs by using, as the active layer, a polysilicon formed by enhancing its crystal growth, as in the first to third embodiments. In FIG. 4, a light-shield pattern, which would be formed conventionally, is not formed in a space between a common line 31 for storage capacitors of pixels and a gate bus line 32 so as to allow light to pass through the space. In FIG. 4, reference numeral 33 denotes a contact hole, 35 denotes a metal pattern for drain pad (wiring), 36 denotes a pixel contact hole, and 37 denotes a pixel electrode.

Figure 12:
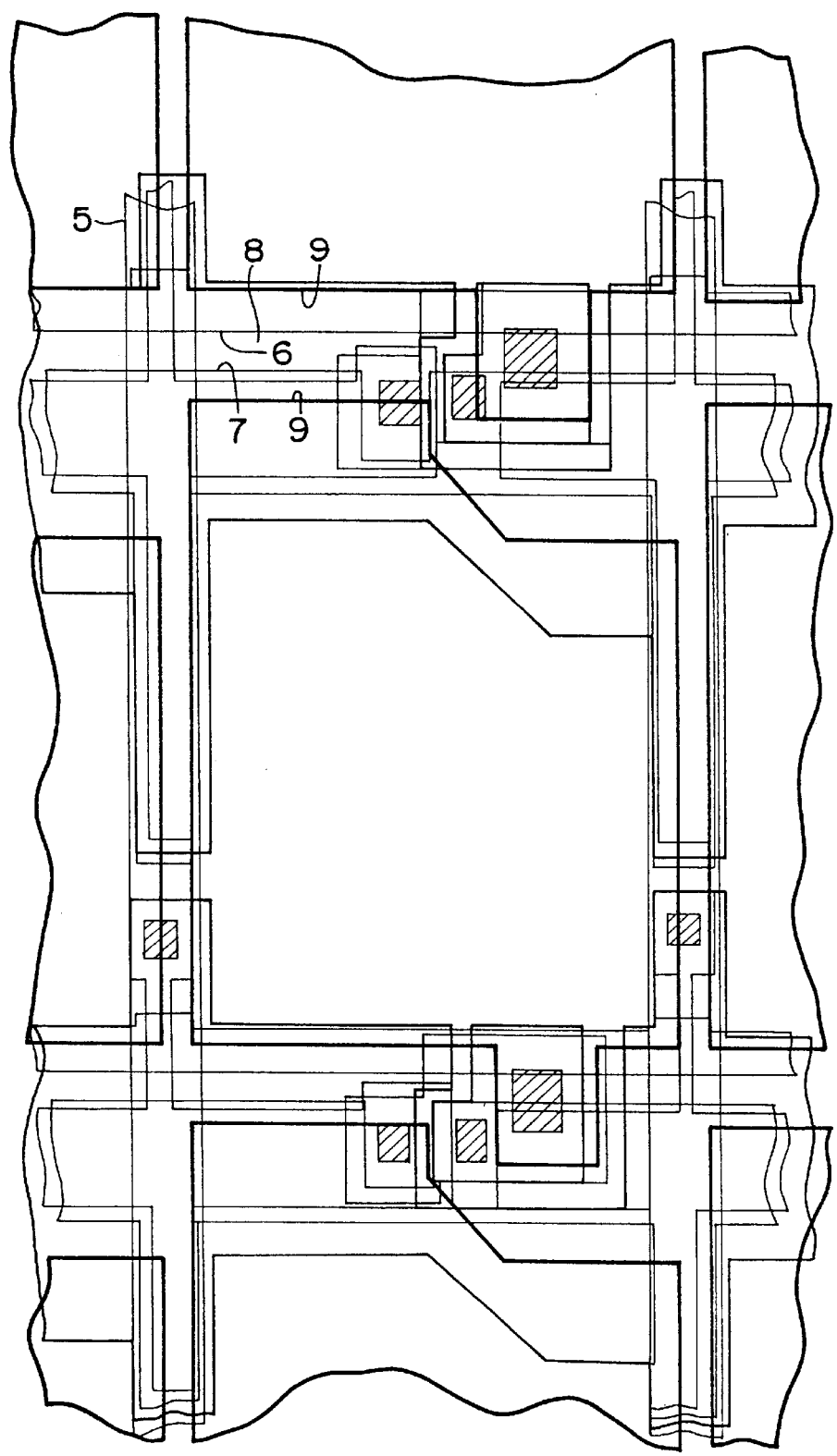
FIG. 12 is a view showing the layout of a display pixel part having a conventional pixel structure equal in size to those of FIGS. 4, 6 and 7.

The pitch of pixels in the display pixel part structured as described above is 18 $\mu m\times 18$ $\mu m$, and the aperture ratio is about 55%. On the other hand, the aperture ratio of the conventional LCD device having the pixel structure of the same size shown in FIG. 12 is about 42%.

The LCD device of this embodiment is driven by the following driving method. That is, in the LCD device of this embodiment, the frame inversion drive is done at an operating frequency twice or more as high as a normal frame frequency. For example in the XGA display, when the video signal is divided into 12-phase and supplied in parallel, the dot clock frequency per data piece of the video signal is set to 12.5 MHz, which is a double of 6.25 MHz (=75 MHz/12) at the normal frame rate of 70 Hz. It is noted here that the frequency of 75 MHz is a video transfer rate at a frame rate of 70 Hz in the XGA display.

Thus, by performing the frame inversion drive, voltages of the same polarity are applied to adjoining pixels, so that a transverse electric field is prevented from occurrence and that light leakage in the black display state, which would cause contrast decrease, is prevented from occurrence in the normally white mode. Therefore, factors of the contrast decrease are evaded, and a high-contrast, uniform display can be fulfilled.

In this case, the frame frequency is 140 Hz, which is a double of the normal frame frequency of 70 Hz. Therefore, even if the waveform of a data signal becomes asymmetrical, causing secondary sub-harmonic frequency (½ frequency) components, due to asymmetry of data voltage, asymmetry of TFT characteristics, changes with time of data voltage, or other reasons, the frequency of the sub-harmonic frequency components is about 70 Hz. Thus, the sub-harmonic frequency components are not observed as the flicker. In this connection, no flicker was of course observed in operation at a frame frequency of 140 Hz. Also, there was no problem at a lower frame frequency of 100 Hz. However, when the frame frequency was dropped to 80 Hz, a slight flicker was observed. This deteriorates the display quality more or less, although not to an impractical level.

From the reasons described above, the lower limit of the frame frequency for practical use is defined as about 100 Hz in this embodiment. The frame frequency of 100 Hz is a numerical value that was not achieved by conventional high-temperature polysilicon TFTs, and that serves as a guide for prevention of deterioration of the display quality. However, frame frequencies somewhat below this 100 Hz are also covered by the invention, hence the expression of "about 100 Hz" is used. This is true not only with this embodiment but also with the foregoing first to third embodiments as well as fifth and sixth embodiments described later.

On the other hand, when the conventional horizontal line inversion drive is performed, there occurs, at or near the edge of display electrodes, an inverted-tilt domain where liquid crystal molecules rise or get up in inverse directions. Also, because of a strong transverse electric field present between pixels adjoining each other along the source bus line, there occurs a region where liquid crystal molecules do not completely rise. Due to this, in the normally white mode, there occurs light leakage, in the black display state, at the domain boundaries and the regions where liquid crystal molecules do not completely rise, which causes the contrast to considerably lower.

In the case of a driver-integrated panel made by using conventional high-temperature polysilicon TFTs, if the horizontal line inversion drive providing for a stable operation is performed, there arise, in the black display state of the normally white mode, liquid crystal domain boundaries and regions where liquid crystal molecules do not completely rise due to transverse electric fields, in the vicinity of pixel electrodes adjoining each other along the vertical direction in the figure, with the result that light leakage occurs over a wide range. Normally, to avoid decrease of the aperture ratio, the common line for the storage capacitors and the gate bus line are provided over the region where the light leakage occurs. Notwithstanding, the contrast would lower without light shield provided over a wide range near those lines. In particular, since there exists a wide region of light leakage between the common line for the storage capacitors and the gate bus line, the contrast would largely lower without forming a light-shield film therebetween.

The driver-integrated panel of this embodiment uses TFTs each having, as the active layer, a polysilicon formed by enhancing its crystal growth. Therefore, a frame inversion drive at a double speed of the normal frame frequency of about 70 Hz can be performed. Such frame inversion driving does not cause transverse electric fields between pixels adjoining each other along the source bus line, and the deterioration in contrast due to light leakage is prevented from taking place in the black display state in the normally white mode. Accordingly, a high aperture ratio can be obtained with the light-shield pattern omitted. Furthermore, the flicker can be prevented by performing the drive at a double frame frequency.

In the above description, the dot clock frequency per data is set to 12.5 MHz in order that the XGA display by the frame rate of 70 Hz is doubled in speed. However, the present invention is not limited to the above frequency. In addition, the conversion into 12-phase in XGA may be changed and adjusted as far as the cost and performance permit.

(Fifth Embodiment)

In the foregoing embodiments, a double-speed frame inversion drive is performed so as to prevent the flicker. As a result of this, there occur some problems, described below, which would not matter particularly in the conventional horizontal line inversion drive.

That is, in the frame inversion drive, a parasitic capacitance exists between the source bus line and the pixel electrode. Particularly in the small-sized active-matrix-driven LCD device such as those used in projection systems, since the pixel size is 25 $\mu$m×25 $\mu$m or less, the area of the storage capacitor cannot be increased, nor can space be provided between the pixel electrodes and the source bus line if the aperture ratio is wished to be secured. As a result, the value of the capacitance between the pixel electrode and the source bus line becomes large relative to the storage capacitor.

Figure 5:
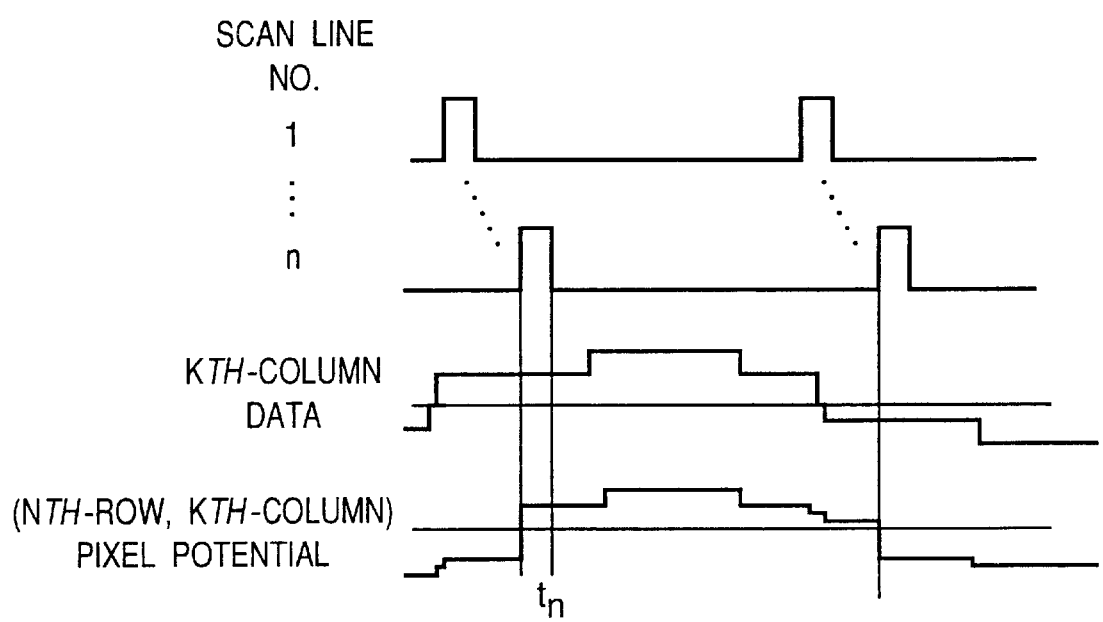
FIG. 5 is an explanatory view of a vertical crosstalk due to a capacitance between the pixel electrode and the source bus line.

Then, as shown in FIG. 5, at a time after a time point $t_n$ of write completion to the nth-row pixel electrodes, due to a capacitance between the nth-row pixel electrodes and the kth-column source bus line, a (nth-row, kth-column) pixel potential varies under the effect of the potential of the (n+1)th and following rows in the kth-column data. For this reason, in the case of the frame inversion drive, there arises a problem that vertical crosstalk occurs and the display quality lowers. In this connection, in the case of the horizontal inversion drive, since the nth-row potential and the (n+1)th-row potential in the kth-column data are opposed in polarity, their effects are balanced to a negligible level.

Figure 6:
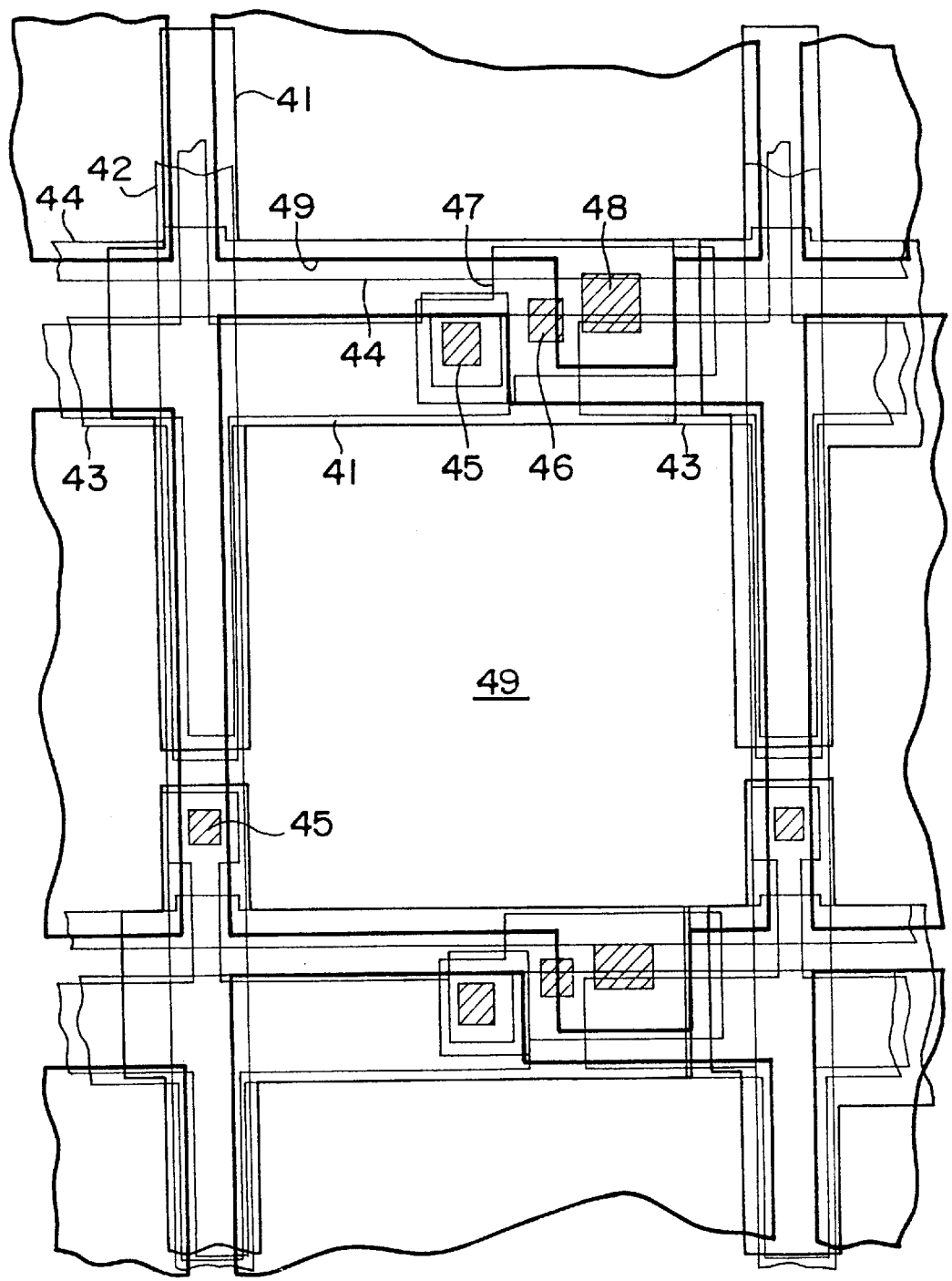
FIG. 6 is a view showing the layout of a display pixel part different from that of FIG. 4.

FIG. 6 schematically shows the layout of a display pixel part in the LCD device of this embodiment. In this embodiment, TFTs that realize the double speed of conventional polysilicon TFTs by having, as the active layer, a polysilicon formed by enhancing its crystal growth are used as TFTs (formed at intersections of gate bus lines 44 and source bus lines 42) for the pixels, as in the first to third embodiments. Then, a light-shield pattern layer 41 (equivalent to the light-shield film 22 in FIG. 1) made of a metal or other conductor and having an electrostatic shield function is provided above the source bus line 42 and under an edge portion of a pixel electrode 49 with an interlayer insulator (equivalent to the interlayer insulator 23 in FIG. 1) interposed therebetween. Reference numeral 43 denotes a common electrode for storage capacitors, 45 denotes a contact hole, 46 denotes a via hole, 47 denotes a metal pattern and 48 denotes a pixel contact hole.

The pitch of pixels in the display part structured as described above is 18 $\mu$m×18 $\mu$m, and the aperture ratio is about 53%, which is smaller by the amount corresponding to the light-shield pattern layer 41 between the gate bus line 44 and the common electrode 43 for storage capacitors than in the fourth embodiment. On the other hand, the aperture ratio of the conventional LCD device having the pixel structure of the same size shown in FIG. 12 is about 42%.

The effects of the capacitance between the source bus line 42 and the pixel electrode 49 are reduced or alleviated by binding the potential of the light-shield pattern layer 41 to a specified potential, so that the vertical crosstalk can be made practically utterly indiscernible.

The LCD device of this embodiment, as in the case of the fourth embodiment, performs the frame inversion drive at 140 Hz, which is a double of the normal frame frequency of 70 Hz, in the XGA display. By performing the frame inversion drive, voltages of the same polarity are applied to adjoining pixels, so that the occurrence of a transverse electric field is prevented and that the occurrence of light leakage, which would cause contrast decrease, is prevented in the black display state in the normally white mode. Thus, factors of the contrast decrease are evaded, and a high-contrast, uniform display can be fulfilled while a high aperture ratio is maintained.

In this case, the frame frequency is 140 Hz, which is a double of the normal frame frequency of 70 Hz. Therefore, even if the waveform of a data signal becomes asymmetrical, causing a secondary sub-harmonic frequency (½ frequency) component, due to asymmetry of data voltage, asymmetry of TFT characteristics, changes with time of data voltage, or other reasons, the frequency of the sub-harmonic frequency components is about 70 Hz. Thus, the sub-harmonic frequency components are not observed as the flicker. Furthermore, by the function of the light-shield pattern layer 41, the effects of the capacitance between the source bus line 42 and the pixel electrode 49 are reduced, so that the vertical crosstalk is prevented.

On the other hand, when the conventional horizontal line inversion drive is performed, there occurs, at and near the edges of the display electrodes, an inverted-tilt domain where liquid crystal molecules rise or get up in inverse directions. Also, because of a strong transverse electric field present between pixels adjoining each other along the source bus line, there occurs a region where liquid crystal molecules do not completely rise. Due to this, in the normally white mode, there occurs light leakage, in the black display state, at the domain boundaries and the regions where liquid crystal molecules do not completely rise, which causes the contrast to considerably lower.

In the case of a driver-integrated panel using conventional high-temperature polysilicon TFTs, the horizontal line inversion drive offering a stable operation causes light leakage at liquid crystal domain boundaries and regions where liquid crystal molecules do not completely rise, in the black display state in the normally white mode, even with a pixel structure in which the light-shield pattern layer having electrostatic shield function is provided above the source bus line. As a result, the contrast would lower considerably. If the region where light leakage occurs is shielded from light for prevention of light leakage, then the aperture ratio would lower considerably.

The driver-integrated panel of this embodiment uses the TFTs each having, as the active layer, a polysilicon formed by enhancing its crystal growth. Therefore, in the XGA display, the frame inversion drive can be performed at 140 Hz, which is a double rate of the normal frame frequency of 70 Hz. Thus, in addition to prevention of light leakage due to transverse electric fields between adjoining pixels by performing the frame inversion drive, prevention of flicker is fulfilled by performing the drive or operation at the frame frequency of 140 Hz.

Further, in this embodiment, the light-shield pattern layer 41 having the electrostatic shield function is provided between the source bus line 42 and each pixel electrode 49. Therefore, with the potential of the light-shield pattern layer 41 bound to a specified potential, the effects of the capacitance between the source bus line 42 and the pixel electrode 49 are alleviated so that the vertical crosstalk is prevented.

To be short, the arrangement according to this embodiment eliminates almost all of the effects of the capacitance between the source bus line 42 and each pixel electrode 49. Therefore, even if the pixel size is 25 µm×25 µm or less, the aperture ratio can be ensured without increasing the value of the pixel electrode 49—source bus line 42 capacitance relative to the storage capacitance. That is, a small-sized active-matrix-driven LCD device which is capable of displaying a high-quality, high-definition image with the pixel pitch of about 18 µm×18 µm and which is optimal for projection systems can easily be realized.

(Sixth Embodiment)

As described before, there are limitations in the voltage of display data (video signal) supplied from data driver from the viewpoints of transistors' breakdown voltage of the data driving circuits and power consumption. Therefore, when the horizontal line inversion drive is performed on an active-matrix-driven LCD device, disadvantageously an insufficient drive voltage may be applied to the liquid crystals, which in turn makes it hard to achieve a high contrast particularly in the normally white mode display.

In this embodiment, as a solution to this problem, a capacitance which falls within a range of 0.5% to 10% of the storage capacitance is provided between pixel electrodes adjoining each other along the source bus line. Then, a double-rate frame inversion drive is performed.

Figure 7:
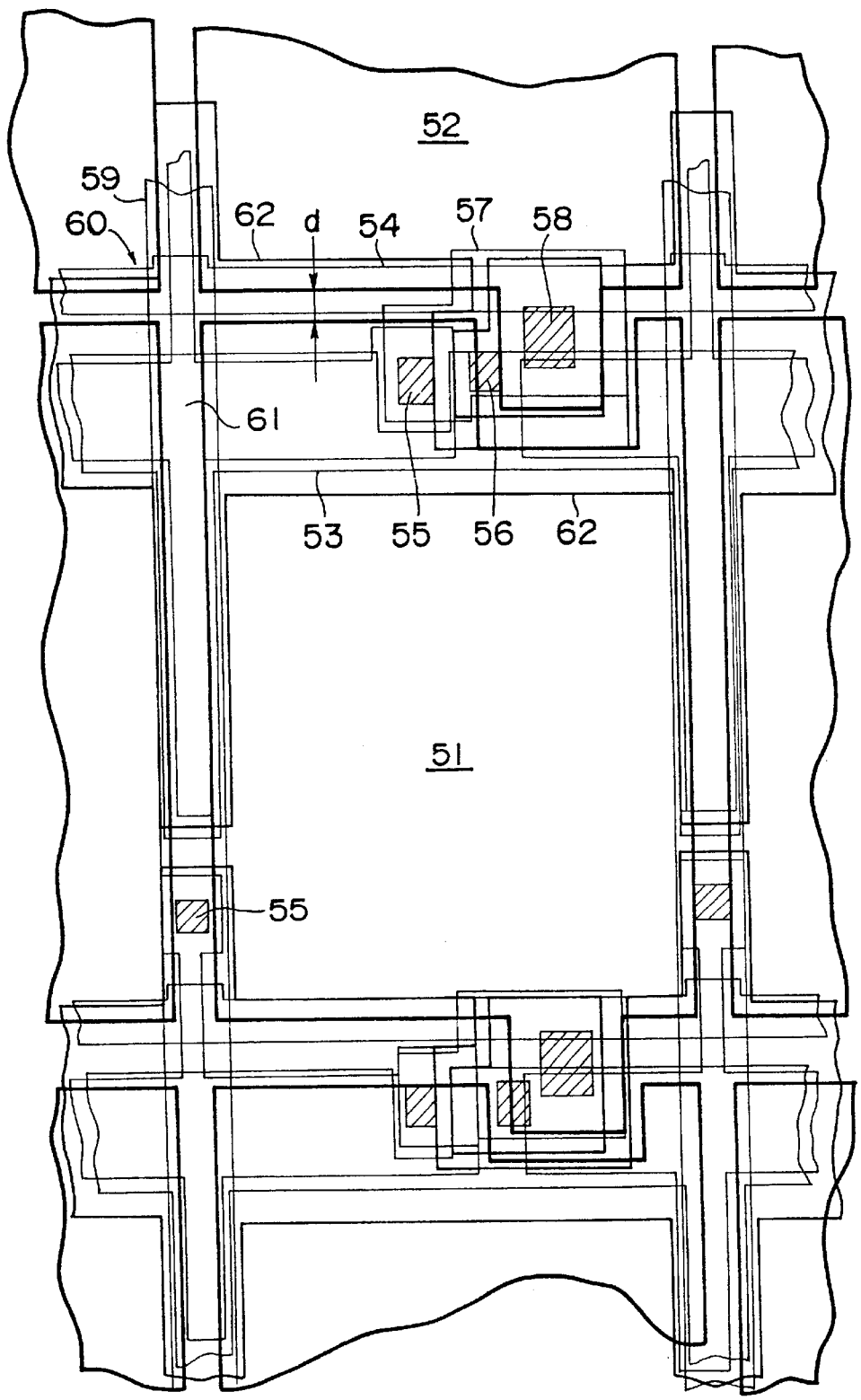
FIG. 7 is a view showing the layout of a display pixel part other than those of FIGS. 4 and 6.

FIG. 7 schematically shows the layout of a display pixel part in an LCD device of this embodiment. In this embodiment, as in the foregoing first to third embodiments, a TFT that has, as the active layer, a polysilicon formed by enhancing its crystal growth and that fulfills a double speed of conventional polysilicon TFTs are used for the pixels, as in the first to third embodiments. Then, pixel electrodes 51, 52 adjoining each other via a gate bus line 54 are shaped and arrayed such that their opposing edges are held at a specified distance d from each other. The specified distance d is a length which is 15% or less of the size of the pixel electrode 51 along the direction in which a source bus line 59 extends. By so doing, the capacitance between the adjoining pixel electrodes 51, 52 can be so set that an added voltage ΔV, which will be detailed later, can sufficiently be obtained. Reference numeral 53 denotes a storage capacitor, 55 denotes a contact hole, 56 denotes a via hole, 57 denotes a metal pattern and 58 denotes a pixel contact hole.

The pitch of pixels in the display part structured as described above is 18 µm×18 µm, and the aperture ratio is about 53%. On the other hand, the aperture ratio of the conventional LCD device having the pixel structure of the same size shown in FIG. 12 is about 42%.

The LCD device of this embodiment, as in the case of the fourth and fifth embodiments, performs the frame inversion drive at 140 Hz, which is a double speed of the normal frame frequency of 70 Hz, in the XGA display. By performing the frame inversion drive, the occurrence of light leakage, which would cause contrast decrease, is prevented in black display state in the normally white mode. Furthermore, the flicker is prevented by setting the frame frequency to 140 Hz.

In the case of the horizontal inversion drive, the effective voltage to be applied to the pixel electrode 51 becomes low relative to the display data voltage supplied from the data driver (not shown), so that the contrast lowers.

Figure 8:
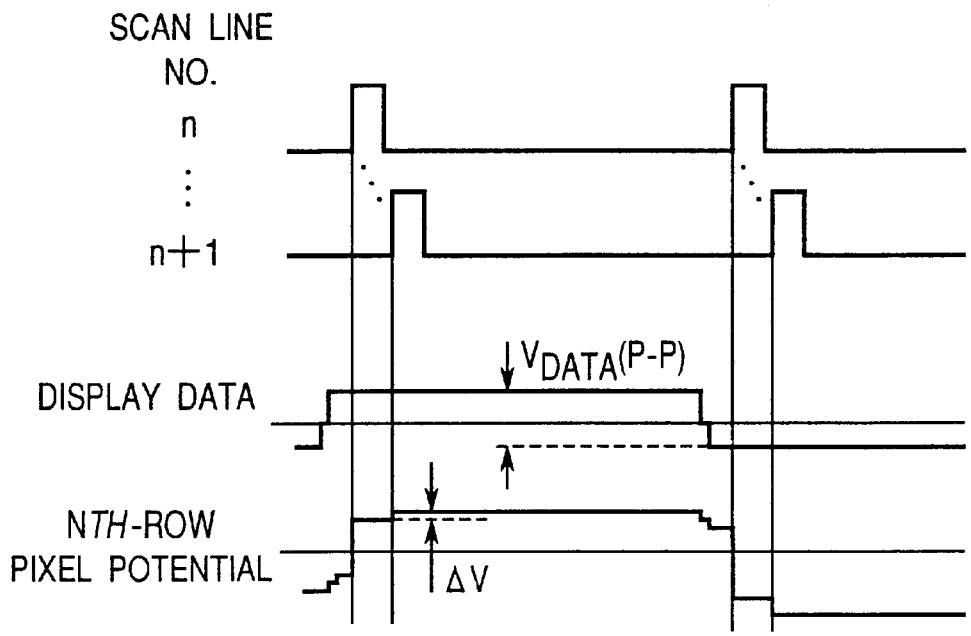
FIG. 8 is an explanatory view in which a voltage obtained by adding a specified voltage ΔV to the voltage of the video signal is applied to pixel electrodes in the display pixel part shown in FIG. 7.

In contrast, when the frame inversion drive is performed, providing a capacitance of an appropriate magnitude with respect to the capacitance of the storage capacitor 53 (including the parasitic capacitance associated with the liquid crystals and pixel electrodes 51) between the pixel electrodes 51, 52 as described above makes it possible to apply to the nth-row pixel electrode 51 a voltage resulting from adding the specified voltage ΔV expressed by Equation (1) to a voltage $V_{DATA}$ of display data (video signal) supplied from the data driver as shown in FIG. 8:

$$\Delta V = V_{DATA}(P-P) \times Cpp(Y)/(Cs+Clc+Csd+Cpp(Y)+Cgd) \quad (1)$$

Figure 9:
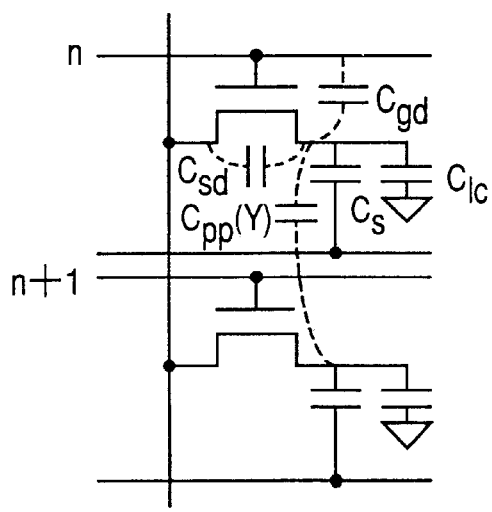
FIG. 9 is a conceptual view showing a storage capacitor and its parasitic capacitances.

Strictly speaking, $V_{DATA}(P-P)$ represents a potential variation of the (n+1)th-row pixel electrode, although in FIG. 8, $V_{DATA}(P-P)$ is indicated as a voltage value between the maximum and minimum peaks of display data voltage supplied by the data driver. However, since the display data is inverted in frames at a constant level in FIG. 8, it does not matter almost at all to consider $V_{DATA}(P-P)$ to be the voltage value between the maximum peak and minimum peak of the display data voltage. Further, as shown in FIG. 9, Cpp(Y) is a capacitance between the adjoining pixel electrodes 51, 52, Cs is a capacitance of the storage capacitor 53, Clc is a capacitance of liquid crystals, Csd is a parasitic capacitance between the source bus line 59 and the pixel electrode 51, and Cgd is a parasitic capacitance between the gate bus line 54 and the pixel electrode 51. That is, the denominator of Equation (1), (Cs+Clc+Csd+Cpp(Y)+Cgd), is a total sum of the storage capacitor 53 and its parasitic capacitances. Then, as can be understood from Equation (1), when Cpp(Y) has an appropriate value for the value of (Cs+Clc+Csd+Cgd), a large value of $\Delta V$ can be obtained.

The addition of $\Delta V$ by the nth-row pixel electrode will be explained more concretely. For example, if a voltage of the positive polarity is applied to the nth-row pixel electrode, a voltage of the negative polarity was held on the (n+1)th-row pixel electrode before a voltage of the positive polarity is now applied to the (n+1)th-row pixel electrode. Thus, the potential of the nth-row pixel electrode moves in such a direction as to be added to the positive potential side via the Cpp(Y). Also when a voltage of the negative polarity is applied to the nth-row pixel electrode, the potential of the nth-row pixel electrode moves in a similar manner but to the negative potential side now.

Figure 10:
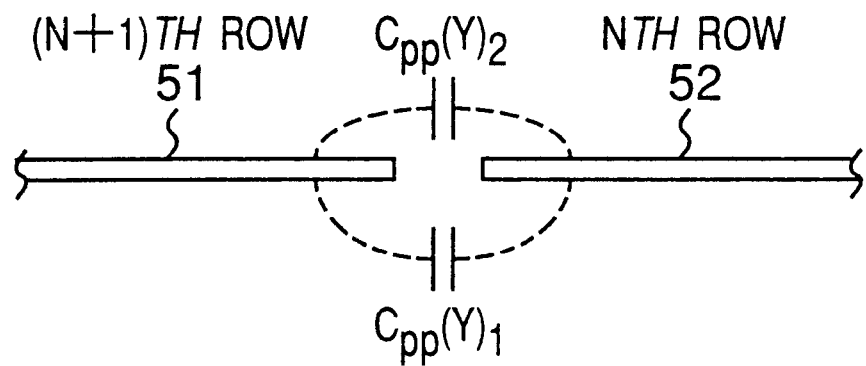
FIG. 10 is a view showing a coupling capacitance between adjoining pixel electrodes.

In this embodiment, as shown in FIG. 10, the capacitance $Cpp(Y) (=Cpp(Y)_1+Cpp(Y)_2)$ between the adjoining pixel electrodes 51, 52 has a coupling capacitance relatively large with respect to the capacitance Cs of the storage capacitor 53 because of a small distance between the adjoining pixel electrodes 51, 52. Specifically, Cpp(Y) is about 1 fF and (Cs+Clc+Csd+Cpp(Y)+Cgd) is about 20 fF. As a result, an added voltage $\Delta V$ of about 250 mV was obtained for $V_{DATA}(P-P)=5$ V.

Consequently, if the LCD device of this embodiment uses the same liquid crystal material and the same cell parameters (such as the orientation film, orientation direction, cell thickness, etc.) as a conventional LCD device, the LCD device of this embodiment can offer display of the same contrast with the display data of a voltage that is about 250 mV lower than that of the conventional LCD device.

As described above, the driver-integrated panel of this embodiment uses the TFTs each having, as the active layer, a polysilicon formed by enhancing its crystal growth. Therefore, in the XGA display, the frame inversion drive can be performed at 140 Hz, which is a double rate of the normal frame frequency of 70 Hz. Thus, in addition to prevention of light leakage due to transverse electric fields between adjoining pixels by performing the frame inversion drive, prevention of flicker is fulfilled by performing the drive or operation at the frame frequency of 140 Hz.

Further, in this embodiment, pixel electrodes 51, 52 adjoining each other along the extending direction of the source bus line 59 via a gate bus line 54 are arrayed at a specified spacing d, which is 15% or less of the length of the pixel electrode 51. Therefore, when the pixel pitch is 18 μm×18 μm as described above, a capacitance Cpp(Y) of about 1 fF between adjoining pixels can be obtained so that a voltage resulting from adding the voltage of about 250 mV to the display data maximum peak-to-minimum peak voltage of 5 V can be applied to the pixel electrode 51.

Consequently, according to this embodiment, a sufficient drive voltage is applied to liquid crystals so that a high contrast is obtained in the normally white mode display without sacrificing the aperture ratio of the pixels. In particular, the more the pixel size decreases, the more this effect increases. In the normal photolithography, with the pixel size at a pitch of 20 μm–30 μm or lower, the inter-pixel space is set to about 2 μm–3 μm. Under this condition, the inter-pixel space reduces to 5%–15% in the extending direction of the source bus line, so that an appropriate added potential is obtained and an aperture ratio improvement effect by the drive method is obtained. Needless to say, such effects can be exerted also with pixels larger than the above range, and the effects of this embodiment are achievable. Further, according to this embodiment, a low drive voltage and a high contrast can be obtained at the same time. Generally, it is extremely difficult to reduce the drive voltage by improvement in liquid crystal material. In particular, because of the drive voltage reduction being in a trade-off relationship with the reliability of liquid crystals, the effect of drive voltage reduction by this pixel structure is very large in that the reliability problem of liquid crystals can be evaded.

Figure 11:
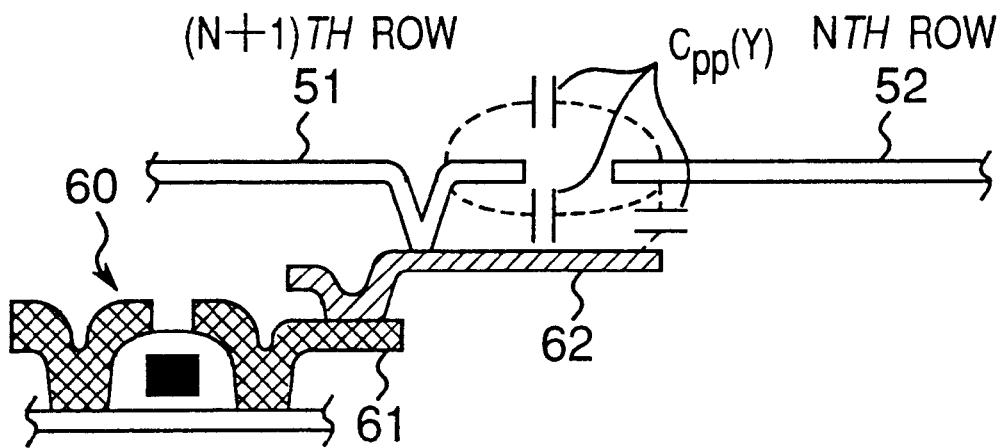
FIG. 11 is a view showing a coupling capacitance between adjoining pixel electrodes in the display pixel part shown in FIG. 7.

In this embodiment, by setting the distance d between the adjoining pixel electrodes 51, 52 to 15% or lower of the length of the pixel electrode 51, an appropriate value of the capacitance between the adjoining pixel electrodes 51, 52 with respect to the capacitance Cs of the storage capacitor 53. However, when the pixel size is larger so that a large space is present between pixels, or when the value of the capacitance Cs of the storage capacitance 53 is large, an electrically conductive light-shield layer 62 connected to the metal layer of a drain line 61 of a TFT 60 is placed overlapping both the pixel electrode 51 and its adjoining pixel electrode 52 with an insulating film (not shown) interposed therebetween as shown in FIGS. 7 and 11. Then, by making use of the overlap of the light-shield layer 62 and each of the adjoining pixel electrodes 51, 52, an even larger capacitance Cpp(Y) between the adjoining pixel electrodes 51, 52 is obtainable.

In this embodiment, the capacitance Cpp(Y) between the adjoining pixel electrodes 51, 52 is, desirably, within a range of not less than 0.5% but not more than 10% of the capacitance Cs of the storage capacitor 53. This is because with the capacitance Cpp(Y) lower than 0.5% of the capacitance Cs of the storage capacitor 53, a sufficient added voltage $\Delta V$ cannot be obtained for the voltage, $V_{DATA}$, of the display data. Also, with the capacitance Cpp(Y) larger than 10% of the capacitance Cs of the storage capacitor 53, variations in the capacitance Cpp(Y) between the pixel electrodes 51, 52 would lead to variations in the added voltage $\Delta V$ and eventually appear as fluctuations of the transmittance of liquid crystals.

Figure 13:
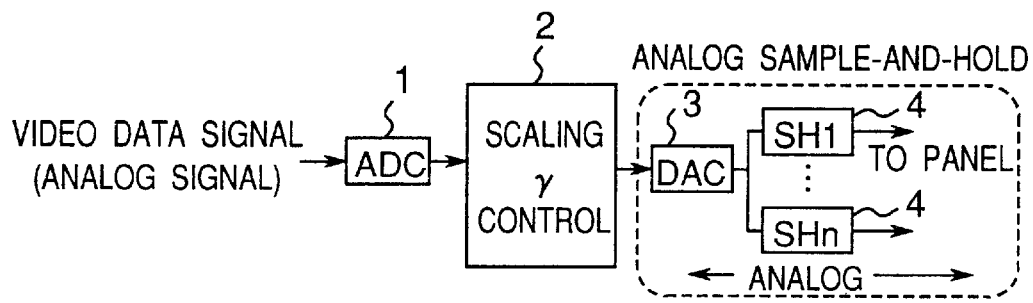
FIG. 13 is a view showing an example of the configuration of a driving system in a conventional active-matrix-driven LCD device.
Figure 14:
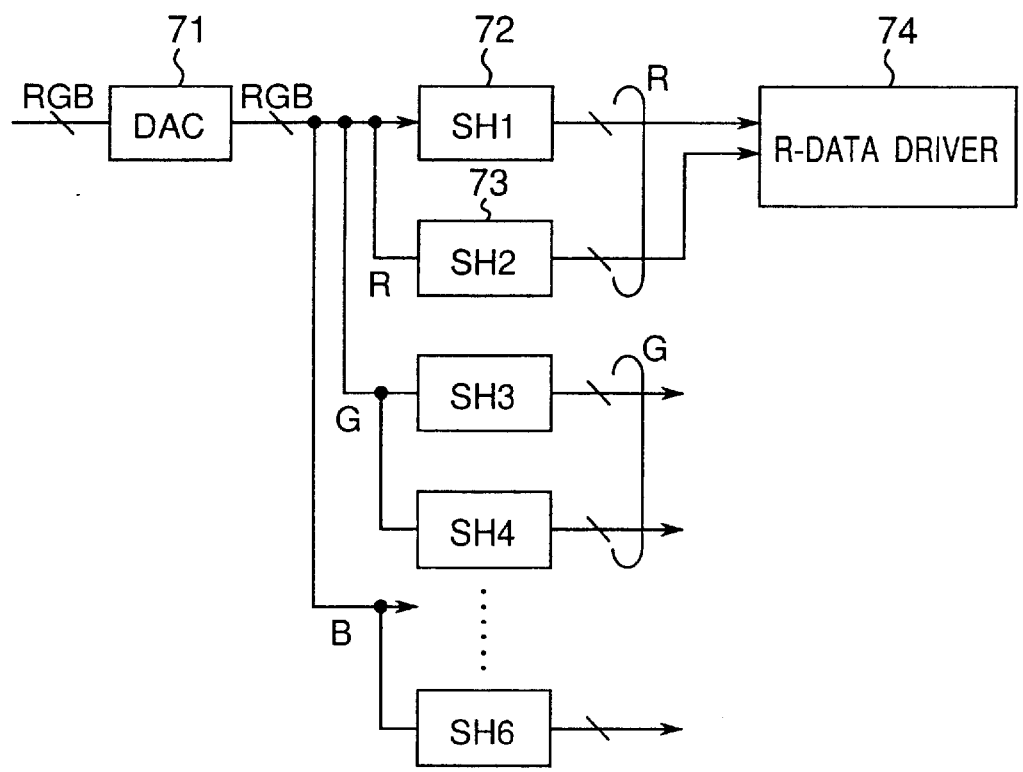
FIG. 14 is a view showing an example of a sample-and-hold circuit with an assumption of n=12 in FIG. 13.

The following will describe by way of example a case where the data driver of the active-matrix-driven LCD device is so structured that the video signal is sequentially held in capacitances of the source bus line by analog switches controlled by output of the horizontal scanning circuit and where the driving is performed by a method that the video signal is divided into multiphase signals with the transfer frequency lowered and then supplied in parallel, namely, a multi-point simultaneous sampling drive method of dot sequential drive, with an assumption that n=12 (where n is the number of simultaneous samples) in FIG. 13. FIG. 14 shows an example of a driving system having two sample-and-hold circuits 72, 73 for each color of R (red), G (green) and B (blue), where only a data driver 74 for color of R is representatively shown.

Of analog video signals of each color of R, G and B output from a D/A converter 71, an R analog video signal is input to the sample-and-hold circuits 72, 73. Then, as shown in FIGS. 15A–15C, the analog signal is sampled by 6 dots each, totally 12 dots, by the two sample-and-hold circuits 72, 73, and held for a period of 12 dots. Then, the signal is output from the sample-and-hold circuits 72, 73 as 12 parallel data and supplied to the R-color data driver 74. The 12 parallel data in the R-color data driver 74 are transferred simultaneously to twelve source bus lines 77 by twelve analog switches 76 which open and close in synchronization with pulses of a scan signal derived from a horizontal scanning circuit 75, which is implemented by a shift register, as shown in FIG. 16

Thereafter, the above operation is iterated. The operation of the data driver is performed in this way. As shown above, in the multi-point simultaneous sampling drive method, the sampling operation is done on a block basis, that is, taking a plurality of lines as one block.

In the sampling operation on the block basis taking a plurality of lines (i.e., a plurality of pixels) as one block as done in the aforementioned multi-point simultaneous sampling drive method, if the horizontal line inversion drive is employed, there would arise a problem that with capacitive coupling, namely coupling capacitors $C_\alpha$, $C_\beta$, present between pixels adjoining each other along the gate bus line, the hold potentials of the adjoining pixels in a current simultaneously-sampled pixel block and a next simultaneously-sampled block fluctuate and that the fluctuation is observed as a vertical stripe.

The cause of this is that in the horizontal line inversion drive, only the pixel potential of a pixel electrode at an end of the simultaneously sampled pixel block is affected by the pixel and the source bus line potential, of the next sampled pixel block, that changes largely up to the inverse sign due to a capacitive coupling with its adjoining pixel electrode or a capacitive coupling with the associated source bus line.

However, the frame inversion drive is performed in the foregoing embodiments. Therefore, even with the use of data drivers of the same structure and drive method, potential variations of the source bus line and the pixel electrodes of the simultaneously sampled block in contact with the next sampled pixel block are suppressed, so that the stripes are prevented from occurring. Thus, the display quality can be greatly improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active-matrix-driven LCD device comprising:
   a driver circuit and a display section are formed on one substrate and in which each of thin-film transistors included in the driver circuit and/or display section has an active layer made of a polysilicon that has been formed by enhancing crystal growth thereof, wherein the driver circuit operates to write data of a same polarity to all pixels of an entire one-frame screen but write data of different polarities to different frames adjoining each other on a time base at a frame frequency of about 100 Hz or more; and
   a capacitance is provided between immediately adjacent pixel electrodes in a direction in which a source line extends, wherein the capacitance is of a value that falls within a range of 0.5 to 10% of a storage capacitance value.

2. An active-matrix-driven LCD device comprising:
   a driver circuit and a display section formed on one substrate, each of thin-film transistors included in the driver circuit and display section has an active layer comprising polysilicon that has been formed by enhancing crystal growth thereof;
   wherein the driver circuit operates to write data of a same polarity to all pixels of an entire one-frame screen but write data of different polarities to different frames adjoining each other on a time base at a frame frequency of about 100 Hz or more;
   a gate bus line and an auxiliary-capacitance common line disposed in parallel and spatially spaced from each other, and
   a space between the gate bus line and the auxiliary-capacitance common line corresponding to an identical pixel forms a light transmitting portion usable for display.

3. The LCD device according to claim 1, wherein the driver circuit comprises a data driver, and the LCD device further comprises an electrically shielding means provided between the source bus line and the pixel electrodes, the source bus line supplying data coming from the data driver to each of the pixel electrodes of the display section.

4. The LCD device according to claim 1, wherein the driver circuit comprises a data driver which performs a dot sequential drive by which a plurality of parallelized data are simultaneously sampled.

5. The LCD device according to claim 1, wherein an array pitch of the pixels in the display section is about 25 $\mu$m×25 $\mu$m or less.

6. An active-matrix-driven LCD device comprising:
   a driver circuit and a disphiy section, wherein the driver circuit operates to write data of a same polarity to all pixels of an entire one-frame screen but write data of different polarities to different frames adjoining each other on a time base, and
   a capacitance provided between pixel electrodes adjoining each other along a source bus line in the display section, said capacitance including an inter-electrode capacitance between adjacent pixel electrodes and a capacitance given by an overlap of an electrically conductive light-shield layer with the adjacent pixel electrodes, said conductive light-shield layer being in electrical communication with a drain of a thin film transistor corresponding to one of the pixel electrodes and disposed at least partially under the adjacent pixel electrodes with an insulating film interposed therebetween.

7. An active-matrix-driven LCD device comprising:
   a driver circuit and a display section, wherein the driver circuit operates to write data of a same polarity to all pixels of an entire one-frame screen but write data of different polarities to different frames adjoining each other on a time base, and
   a capacitance provided between pixel electrodes adjoining each other along a source bus line in the display section, said capacitance including an inter-electrode capacitance between adjacent pixel electrodes and/or a capacitance given by an overlap of an electrically conductive light-shield layer with the adjacent pixel electrodes, said conductive light-shield layer being in electrical communication with a drain of a thin film transistor and disposed at least partially under the adjacent pixel electrodes with an insulating film interposed therebetween; and wherein a space between the pixel electrodes adjoining each other in a direction in which the source bus line extends is about 15% or less of a length(s) along the source bus line of each of the pixel electrodes so that the inter-electrode capacitance between the adjoining pixel electrodes is obtained.

8. An active-matrix-driven LCD device comprising:

a driver circuit and a display section, wherein the driver circuit operates to write data of a same polarity to all pixels of an entire one-frame screen but write data of different polarities to different frames adjoining each other on a time base, and a capacitance provided between pixel electrodes adjoining each other along a source bus line in the display section, said capacitance including an inter-electrode capacitance between adjacent pixel electrodes and/or a capacitance given by an overlap of an electrically conductive light-shield layer with the adjacent pixel electrodes, said conductive light-shield layer being in electrical communication with a drain of a thin film transistor and disposed at least partially under the adjacent pixel electrodes with an insulating film interposed therebetween; and wherein the display section has a storage capacitance for each of the pixels, and a capacitance between pixel electrodes adjacent each other in a direction in which the source bus line extends is within a range of not less than 0.5% but not more than 10% of a storage capacitance associated with the pixel electrodes including a parasitic capacitance.

9. The LCD device of claim 1, further comprising an electrically conductive light-shield layer at least partially overlapping with the adjacent pixel electrodes, said conductive light-shield layer being in electrical communication with a drain of a thin film transistor corresponding to one of the pixel electrodes and disposed at least partially under the adjacent pixel electrodes with an insulating film interposed therebetween.

10. The LCD device of claim 2, wherein the auxiliary-capacitance common line is used in forming the storage capacitance.

* * * * *

UNITED STATES PATENT AND TRADEMARK OFFICE
CERTIFICATE OF CORRECTION

PATENT NO.     : 6,618,033 B2
DATED          : September 9, 2003
INVENTOR(S)    : Takafuji It is certified that error appears in the above-identified patent and that said Letters Patent is hereby corrected as shown below:

Title page,
Item [*] Notice, delete the phrase "by 0 days" and insert -- by 85 days --

Signed and Sealed this

Twelfth Day of October, 2004

JON W. DUDAS
*Director of the United States Patent and Trademark Office*